Feb. 8, 1938.                A. CROSSLEY                2,107,661
                        SOLID PLAITED MATERIAL
                        Filed Nov. 18, 1936           3 Sheets-Sheet 1

INVENTOR
A. Crossley.

Feb. 8, 1938.　　　　　A. CROSSLEY　　　　　2,107,661
SOLID PLAITED MATERIAL
Filed Nov. 18, 1936　　　　3 Sheets-Sheet 2

INVENTOR
A. Crossley
Dowden O'Brien
attys.

Feb. 8, 1938. A. CROSSLEY 2,107,661
SOLID PLAITED MATERIAL
Filed Nov. 18, 1936 3 Sheets-Sheet 3
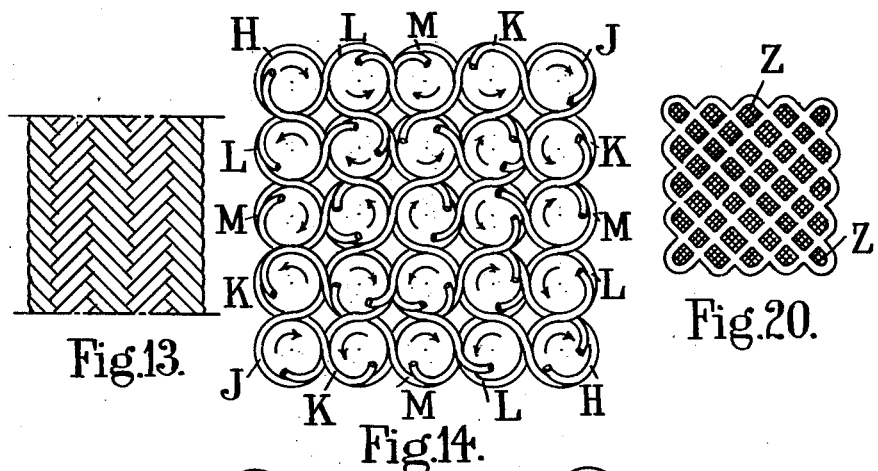
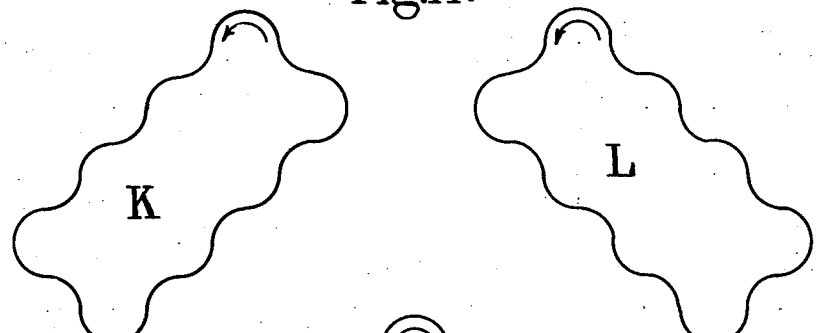
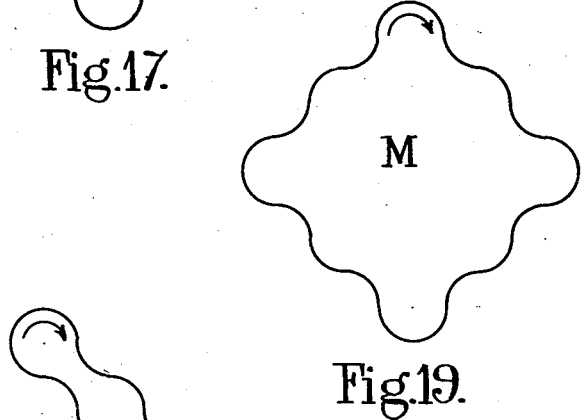
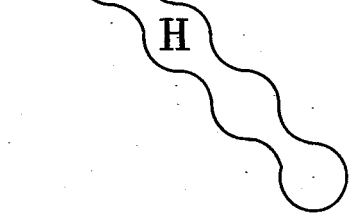
INVENTOR.
A. Crossley.

Patented Feb. 8, 1938

2,107,661

UNITED STATES PATENT OFFICE 2,107,661

SOLID PLAITED MATERIAL

Arthur Crossley, Bolton, England

Application November 18, 1936, Serial No. 111,466
In Great Britain May 9, 1936

5 Claims. (Cl. 96—25)

This invention relates to improvements in plaited material such as is used in the production of packings for glands and other purposes where a material of plaited rope formation is desired of the type having two independent tracks of strands of materials passing through each other from corner to corner and diagonally opposed to each other.

Plaits of this type as hitherto produced are known as solid square plait since they are necessarily square in cross section and the lie of the plait on the longitudinal face is in the form of a single V or herring bone as each strand passes over and under a like number of other strands the number of strands passing over and under depending on the total number of strands in the plait. Thus for example in an eight strand plait, each strand passes over and under two strands, in a twelve strand plait each strand passes over and under three strands and in a sixteen strand plait each strand passes over and under four strands.

Such solid square plaits as hitherto constructed have certain disadvantages viz:—

The solid square plait has certain disadvantages. The fact that only two tracks can be used makes it necessary for the larger plaits, to use strands of considerable size which decreases the pliability of the finished product to a marked degree and results in coarseness of appearance, since the large strands used cause the corners of the square section to be rounded off. The single V appearance on the longitudinal face of the plait cannot be varied whatever the size of cross section made. Any desired cross sectional shape cannot be made, owing to the limited number of core strands which can be introduced, and where cross sectional shapes are required which cannot be produced by the solid square plait method it is necessary to resort to tubular braiding or to moulding which particularly in the case of packings have not the same qualities as the solid square plait.

The object of the present invention is to produce a plaited material which while retaining all the qualities of the solid square plait will remove the disadvantages inherent therein.

According to the present invention the solid plaited material, as in the case of the solid square plait, is formed with two independent tracks of strands (which will be hereinafter referred to as bracing strands) which run diagonally across the plait from corner to corner, crossing the path of each other in the centre and at right angles to one another but there are also introduced one, two or three additional tracks of strands (which will be hereinafter referred to as binding strands) depending on the size and type of plaited material required, the series of tracks of the bobbins laying the binding strands being symmetrically arranged and each strand of each of said tracks emerging at the surface of the plait at two points opposite each other, and on a line which will pass through the centre of the bobbin tracks.

Thus the invention by increasing the number of tracks employed greatly increases the number of strands in the finished plait so that for a given cross sectional area the size of the strands is reduced resulting in increased pliability of the plait and elimination of coarseness of the appearance whilst the yarns are equally spaced along their respective tracks giving a homogeneous cross section to the plait.

The invention also permits a much larger variation in number of longitudinal core strands as any number from none to thirteen can be introduced in a plait having one track of binding strands, from none to twenty-five in a plait having two tracks of binding strands and from none to forty-one in a plait having three tracks of binding strands. The core strands may be symmetrical or otherwise about the centre of the plait and each is bound separately into position by the bracing and binding strands. It will thus be seen that a very large variety of cross sectional shapes of the plait can be produced. Moreover as each strand of each track appears on the periphery of the plait at two points opposite to each other and on a line which would pass through the centre of the plait, strands of different materials can be used in the bracing and binding tracks, at the same time retaining the symmetry of the material. The symmetrical positioning of the binding and bracing strands results in the plait having a uniform density throughout the cross section thereof.

The invention will be described with reference to the accompanying drawings in which:—

Fig. 13 shows a longitudinal face of a plaited material having three binder strand tracks.

Fig. 14 is a diagrammatic cross section showing the paths of the two bracing strand tracks and the three binder strand tracks superimposed.

Fig. 15 is a diagrammatic cross section of the path of one bracing strand track.

Fig. 16 is a diagrammatic cross section of the path of the other bracing strand track.

Fig. 17 is a diagrammatic cross section of the path of one binder strand track.

Fig. 18 is a diagrammatic cross section of the path of the second binder strand track.

Fig. 19 is a diagrammatic cross section of the path of the third binder strand track.

Fig. 20 is a diagrammatic cross section showing the positions at which the longitudinal core strands can be introduced.

Figure 1:
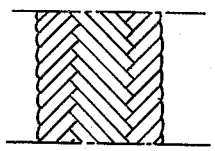
Fig. 1 shows a longitudinal face of a plaited material having one binder strand track.
Figure 6:
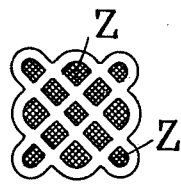
Fig. 6 is a diagrammatic cross section showing the positions at which the longitudinal core strands can be introduced.
Figure 2:
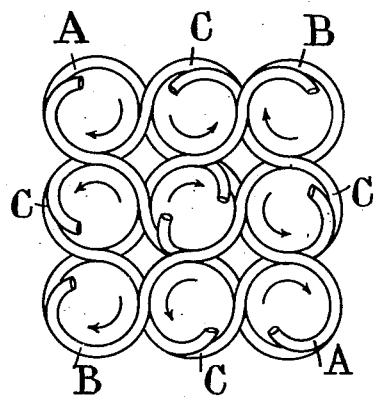
Fig. 2 is a diagrammatic cross section showing the paths of the two bracing strand tracks and the binder strand track superimposed.
Figure 5:
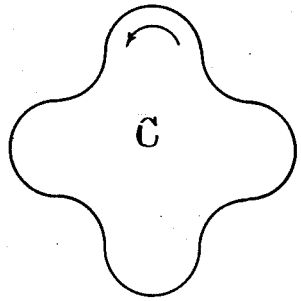
Fig. 5 is a diagrammatic cross section of the path of the binder strand track.
Figure 3:
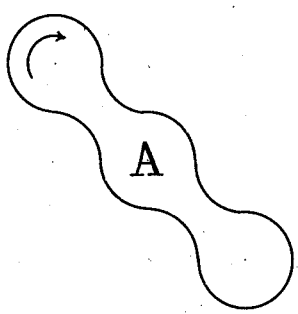
Fig. 3 is a diagrammatic cross section of the path of one of the bracing tracks.
Figure 4:
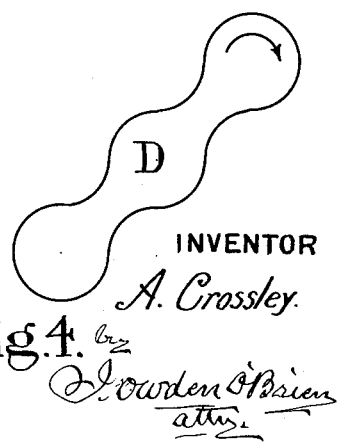
Fig. 4 is a diagrammatic cross section of the path of the other bracing strand track.

In the form of the invention shown in Figs. 1 to 6 the plaited material is produced from the two bracing strand tracks A and B and a single binding strand track C. The bracing strand tracks A and B pass diagonally from one face to the other intersecting one another at right angles in the centre whilst the binding strand track C comes to the surface of the material at four places midway between the bracing strand tracks A and B. Each longitudinal face of the material if the latter is of square cross section will present one and a half V's as shown in Fig. 1.

The plaited material can be formed without longitudinal core strands or any desired number up to thirteen of such strands can be inserted according to the cross sectional shape desired. As will be seen from Fig. 6 thirteen is the maximum number of core strand yarns which can be employed since there are thirteen positions Z between the tracks of the bracing and binder strand tracks any or all of which can receive a longitudinal core strand.

In a three track plait employing two bracing strand tracks and a single binding strand track by using six strands in each of the two diagonally opposed tracks of bracing strands A and B, and eight strands in the track of binding strands C, each individual strand will follow exactly the same procedure as the strands in the usual eight strand solid square plait, viz: will pass over and under two individual strands. If, however, the number of strands be increased to nine in each of the two tracks of bracing strands A and B and eleven in the track of the binding strands C, each individual strand will follow exactly the same procedure as the strands in the usual twelve strand square plait viz: will pass over and under three individual strands. Altering the number of strands used makes no change in the appearance of the material produced, except that a smaller strand can be used when the number of strands are increased to produce a similar cross section of plaited material.

Figure 7:
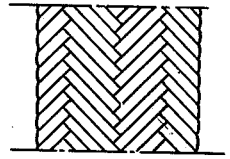
Fig. 7 shows a longitudinal face of the plaited material having two binder strand tracks.
Figure 12A:
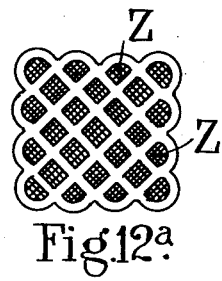
Fig. 12a is a diagrammatic cross section showing the positions at which the longitudinal core strands can be introduced.
Figure 8:
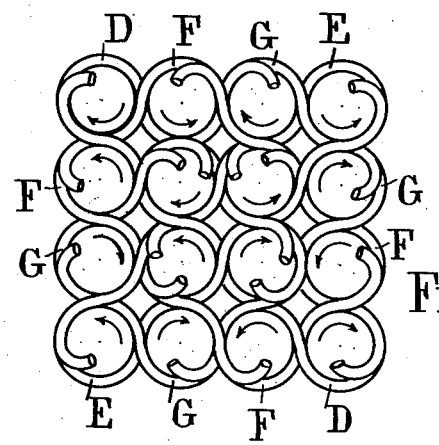
Fig. 8 is a diagrammatic cross section showing the paths of the two bracing strand tracks and the two binder strand tracks superimposed.
Figure 11:
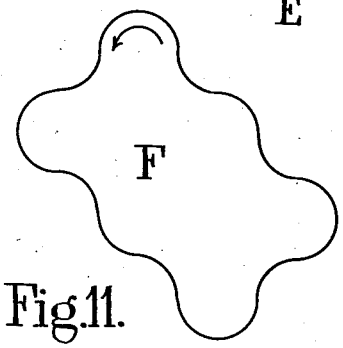
Fig. 11 is a diagrammatic cross section of the path of one of the binder strand tracks.
Figure 12:
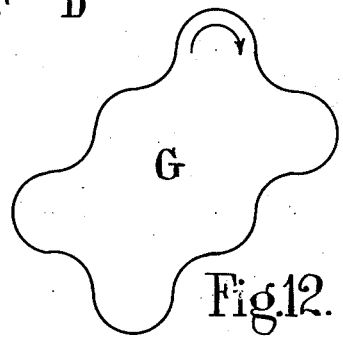
Fig. 12 is a diagrammatic cross section of the path of the other binder strand track.
Figure 9:
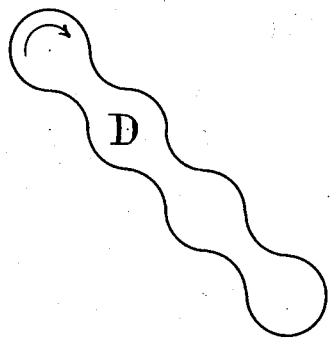
Fig. 9 is a diagrammatic cross section of the path of one bracing strand track.
Figure 10:
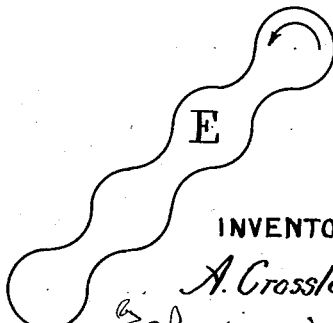
Fig. 10 is a diagrammatic cross section of the path of the other bracing strand tracks.

In the form of the invention shown in Figs. 7 to 12a the plaited material is produced from the two bracing strand tracks D and E and two binding strand tracks F and G. The bracing strand tracks D and E pass diagonally from one face to the other intersecting one another at right angles in the centre whilst the binding strand tracks F and G are symmetrical and balanced about the centre of the plait and come to the surface of the material at four places between the bracing strand tracks D and E. Each longitudinal face of the material if the latter is of square cross section will present two V's as shown in Fig. 7.

The plaited material can be formed without longitudinal core strands or any number up to twenty five can be inserted according to the cross sectional shape required. As will be seen from Fig. 12a twenty five is the maximum number of core strands which can be employed since there are twenty five positions Z between the bracing and binder strand tracks any or all of which can receive a longitudinal core strand.

In a four track plait employing two bracing strand tracks and two binding strand tracks by using eight strands in each of the two diagonally opposed tracks of bracing strands D and E and ten strands in each of the two tracks of binding strands F and G, each individual strand will follow exactly the same procedure as the strands in the usual eight strand solid square plait, viz, will pass over and under two individual strands. If, however, the number of strands be increased to twelve in each of the two tracks of bracing strands D and E, and to fourteen in each of the two tracks of binding strands F and G, each individual strand will follow exactly the same procedure as the strands in the usual twelve strand solid square plait, viz: will pass over and under three individual strands. Similarly as was the case in the three track plait altering the number of strands in the four track plait makes no change in the appearance of the material produced, except that a smaller strand can be used when the number of strands are increased to produce a similar cross section of material.

In the form of the invention shown in Figs. 13 to 20 the plaited material is produced from two bracing strand tracks H and J and three binding strand tracks K, L and M. The bracing strand tracks H and J passing diagonally from one face to the other intersecting one another at right angles at the centre of the plait whilst the binding strand tracks K, L, and M are balanced and symmetrical about the centre of the plait and each comes to the surface at four places between the bracing strand tracks H and J. Each longitudinal face of the material if of square cross section will present two and a half V's as shown in Fig. 13.

The plaited material can be produced without longitudinal core strands or any number up to forty-one can be inserted according to the cross sectional shape required. As will be seen from Fig. 20 forty-one is the maximum number of core strands which can be employed since there are forty-one positions Z between the bracing and binder strand tracks any or all of which can receive a longitudinal core strand.

In a five track plait employing two bracing strand tracks and three binder strand tracks by using ten strands in each of the two diagonally opposed tracks of bracing strands H and J, and twelve strands in each of the three tracks of binding strands K, L, and M, each individual strand will follow exactly the same procedure as the strands in the usual eight strand solid square plait, viz: will pass over and under two individual strands. If, however, the number of strands be increased to fifteen in each of the two diagonally opposed tracks of bracing strands H and J, and to seventeen in each of the three tracks of binding strands K, L, and M, each individual strand will follow exactly the same procedure as the strands in the usual twelve strand square plait, viz: will pass over and under three individual strands. Similarly as was the case in the three track plait, altering the number of strands in the five track plait, makes no change in the appearance on the material produced, except that a smaller strand can be used when the number of strands are increased to produce a similar cross section of material.

What I claim as my invention and desire to protect by Letters Patent is:—

1. A solid plaited material comprising two independent tracks of bracing strands which run diagonally across the material from corner to corner and cross the path of each other at the centre substantially at right angles to one another and at least one track of binding strands symmetrically arranged with respect to the bracing strands and appearing on the surface of the material at four points intermediate the corners, alternate points being situated at the opposite ends of a line passing through the centre of the material, each strand, after crossing another strand on the exterior surface, immediately returning to the interior of the material, and the bracing and binding strands being braided together interiorly of the material.

2. A solid plaited material comprising two independent tracks of bracing strands which run diagonally across the material from corner to corner and cross the path of each other at the centre substantially at right angles to one another and a plurality of tracks of binding strands symmetrically arranged with respect to the bracing strands and appearing on the surface of the material at four points intermediate the corners, alternate points being situated at the opposite ends of a line passing through the centre of the material, each strand, after crossing another strand at the exterior surface, immediately returning to the interior of the material, and each strand in each track being interbraided with another strand at each point where it intersects another track internally throughout the material.

3. A homogeneous square prism of solid plaited material comprising two independent tracks of bracing strands which run diagonally across the material from corner to corner and cross the path of each other at the centre substantially at right angles to one another and a track of binding strands symmetrically arranged with respect to the bracing strands and appearing on the surface of the material at four points intermediate the corners, alternate points being situated at the opposite ends of a line passing through the centre of the material, the binding strands, after crossing another strand on the exterior surface, immediately returning substantially at a right angle to the interior of the material, and the bracing and binding strands being distributed symmetrically around the respective tracks and interbraided to produce a homogeneous structure throughout the material.

4. A homogeneous square prism of solid plaited material comprising two independent tracks of bracing strands which run diagonally across the material from corner to corner and cross the path of each other at the centre substantially at right angles to one another and a track of binding strands equally spaced and symmetrically arranged with respect to the bracing strands and appearing on the surface of the material at four points intermediate the corners, alternate points being situated at the opposite ends of a line passing through the centre of the material, each strand, after crossing another strand on the exterior surface, immediately returning to the interior of the material, and the bracing and binding strands being braided together individually and uniformly interiorly of the material to impart uniform density thereto internally and externally.

5. A homogeneous square prism of solid plaited braided material as in claim 3 having a plurality of longitudinal core strands inserted in the interstices formed between the tracks of the bracing strands and the binder strands.

ARTHUR CROSSLEY.